(No Model.)

W. B. SILVERS.
SPRING TRACE HOLDER.

No. 377,915. Patented Feb. 14, 1888.

Witnesses:
Chas. W. Baggerly,
Gustav Bohn.

Inventor.
Walter B. Silvers.
By C. P. Jacobs
Atty.

UNITED STATES PATENT OFFICE.

WALTER B. SILVERS, OF INDIANAPOLIS, INDIANA.

SPRING TRACE-HOLDER.

SPECIFICATION forming part of Letters Patent No. 377,915, dated February 14, 1888.

Application filed October 25, 1887. Serial No. 253,377. (No model.)

*To all whom it may concern:*

Be it known that I, WALTER B. SILVERS, of Indianapolis, county of Marion, and State of Indiana, have invented certain new and useful Improvements in Spring Trace-Holders; and I do hereby declare that the following is a full, clear, and exact description thereof, reference being had to the accompanying drawings, in which like letters refer to like parts.

My invention relates to the construction of devices for holding traces in position and equalizing the draft, and has for its object the dispensing of the use of any singletree, substituting therefor a spring holding device which will accomplish a similar result in a different and better way, and will be understood from the following description.

Figure 1:
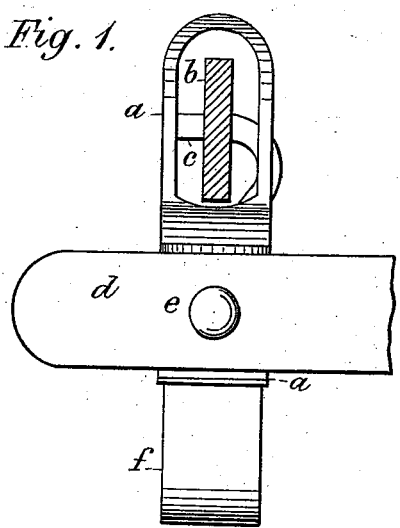
Figure 2:
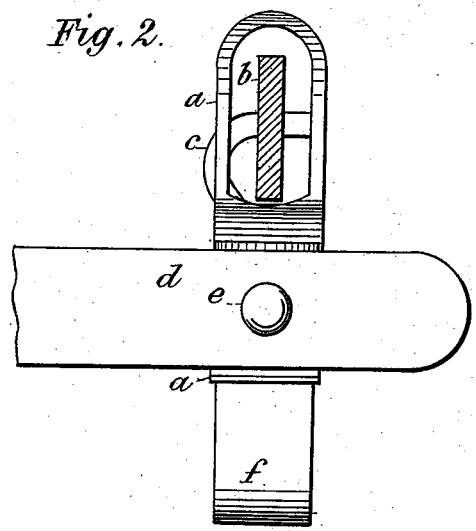
Figure 3:
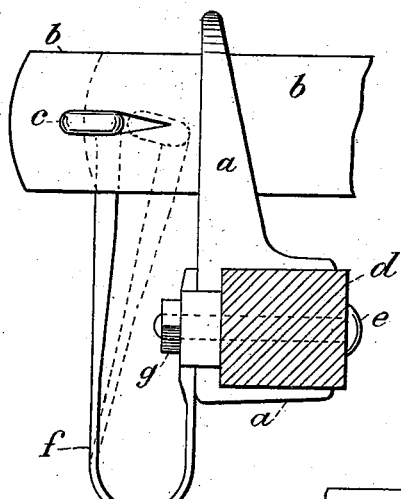
Figure 4:
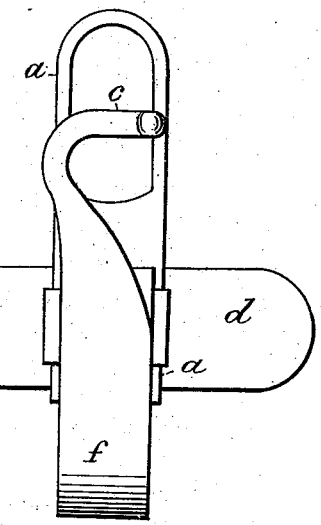
Figure 5:
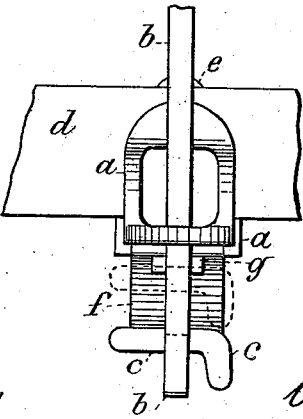

In the drawings, Figure 1 is a front view of my device connected to the cross-bar of the shafts and is intended for use upon the right-hand side. Fig. 2 is a similar view of the same for the left-hand side. Fig. 3 is a side view of the holder, the dotted lines indicating the movement of the spring as the strain is brought upon it. Fig. 4 is a rear view. Fig. 5 is a top view of the same.

In detail, $d$ is the cross-bar that unites the shafts.

$a$ is a metal eye, constructed with lugs on each side, so that the cross-bar may be entered snugly between them.

$e$ is a bolt passing through the cross-bar from front to rear, and also through the shank of the eye, its inner end threaded to receive a nut which unites the parts.

$f$ is a spring, which may be made solid with the eye, or separately, as desired, and, if the latter, it has a hole through which the same bolt passes that unites the cross-bar to the shank, and this particular form is shown in the drawings, as will be seen by reference to Fig. 3. This spring is curved so as to pass below the cross-bar, and its upper end is formed into a hook having a little tang, as shown in Fig. 4.

The form of the eye and the form of the hook are not material, but may be varied to suit the requirements of any particular case, and I do not intend to limit myself to any particular form of either, so that the relative position of the two are maintained.

The trace after passing through the leather guide-loop usually fastened to the shaft is extended through the eye and hooked over the tang of the spring-hook $c$, it being understood, of course, that one of these is used on each side of the shafts. When the strain comes upon the trace, as in starting a vehicle, the spring-hook is drawn forward, and if with sufficient force it will strike against the rear face of the eye, which in this instance will act as a stop and prevent any further strain upon the spring, while at the same time the closing up of the spring-hook against the back of the eye will prevent any possible disengagement of the end of the trace from the tang of the hook, so that the harder the pull the more impossible it will be for the trace to slip off or get loose. The tang of the hook is preferably upset so as to extend a little to the rear, the better to prevent the end of the trace from slipping off; but this is not absolutely necessary. Any extension of the hook will serve the purpose, and the form may be changed as desired. Again, passing the trace through the eye is important, inasmuch as the latter serves as a guide to prevent any great lateral movement of the end of the trace, and it is impossible for it to kink or loop so as to jerk it off the spring-hook, and an eye is therefore necessary to be used in connection with the hook, not only because it is a guide, but because it serves as a stop to prevent too great tension upon the spring, making a secure backing against which a pull may be made without danger of fracturing the spring or injuring any of the parts.

Of course it will be understood that the object and use of an elastic hook are to prevent any added strain or unequal pull upon one of the traces more than upon the other, and to prevent any injury to the breast of the horse, as would be likely to occur in the absence of any such provision. Practically this spring operates to equalize the strain, but in a different manner from that of the ordinary singletree, which is pivoted in the center and moves freely from such pivot; but by this device I am enabled to dispense with the use of the singletree, which not only adds somewhat to the expense, but is annoying in that the hairs of the horse's tail frequently catch under the bolts and are pulled out; and, further, the dangers attending the use of the ordinary singletree by reason of the slipping of the trace off its ends are entirely avoided. This device is preferably attached to the cross-bar of the shaft, but may be arranged to be attached directly to the shaft itself, and in either case the principle of operation would be precisely the same.

What I claim as my invention, and desire to secure by Letters Patent, is the following, viz:

1. A trace-holder comprising a spring-hook secured directly to the back of the shaft-bar, an eye also secured to such cross-bar by the same bolt which secures the spring-hook, and an opening in the eye through which the end of the trace is passed in line with the tang of the hook which holds the trace, substantially as shown and described.

2. A trace-holder comprising a spring-hook to hold the trace, and an eye through which the trace is passed, located directly in front of the hook, the two united to the rear of the shaft-bar by a single bolt, the base of the eye formed into a clip for straddling the cross-bar, substantially as shown and described.

3. A trace-holder comprising a hook connected with a loop-shaped spring whose inner end is secured to the rear of the cross-bar by a bolt which also unites thereto an eye whose lower portion is formed into a clip which clamps the cross-bar, substantially as shown and described.

In witness whereof I have hereunto set my hand this 20th day of October, 1887.

WALTER B. SILVERS.

Witnesses:
C. P. JACOBS,
E. B. GRIFFITH.